United States Patent
Chae et al.

(10) Patent No.: US 12,470,078 B2
(45) Date of Patent: Nov. 11, 2025

(54) CONTROLLER FOR CONTROLLING CONVERTER CHARGING AND DISCHARGING BATTERY AND CHARGER AND DISCHARGER

(71) Applicant: WONIK PNE CO., LTD., Suwon-si (KR)

(72) Inventors: Sooyong Chae, Suwon-si (KR); Hyoungjoong Kim, Suwon-si (KR); Minki Cho, Suwon-si (KR); Kyungrok Kim, Suwon-si (KR); Chanwoong An, Suwon-si (KR)

(73) Assignee: WONIK PNE CO., LTD., Suwon-si (KR)

( * ) Notice: Subject to any disclaimer, the term of this patent is extended or adjusted under 35 U.S.C. 154(b) by 779 days.

(21) Appl. No.: 17/853,520

(22) Filed: Jun. 29, 2022

(65) Prior Publication Data

US 2023/0034073 A1    Feb. 2, 2023

(30) Foreign Application Priority Data

Jul. 30, 2021 (KR) .................. 10-2021-0100823
Aug. 10, 2021 (KR) .................. 10-2021-0105083

(Continued)

(51) Int. Cl.
*H02M 1/38* (2007.01)
*H02J 7/00* (2006.01)
*H02M 3/335* (2006.01)

(52) U.S. Cl.
CPC .......... *H02J 7/00712* (2020.01); *H02M 1/38* (2013.01); *H02M 3/33573* (2021.05); *H02M 3/33584* (2013.01)

(58) Field of Classification Search
CPC . H02M 1/38; H02M 3/33573; H02M 3/33584

(Continued)

(56) References Cited

U.S. PATENT DOCUMENTS

2013/0272032 A1* 10/2013 Mueller ............ H02M 3/33573
                                                          363/17
2015/0295504 A1* 10/2015 Tanahashi ......... H02M 3/33584
                                                          307/24

(Continued)

FOREIGN PATENT DOCUMENTS

JP      2015-056997 A      3/2015
JP      2021-058007 A      4/2021

OTHER PUBLICATIONS

Dead-Time Effect of the High-Frequency Isolated Bidirectional Full-Bridge DCâDC Converter (Year: 2014).*

(Continued)

*Primary Examiner* — David V Henze-Gongola
*Assistant Examiner* — Ryu-Sung P. Weinmann
(74) *Attorney, Agent, or Firm* — Maschoff Brennan (57) ABSTRACT

Disclosed is a charger and discharger of a battery. The charger and discharger includes a converter, the converter including a transformer, a first switching circuit configured to form a current path between the power source unit and a primary side winding of the transformer during a first delivery period, and a second switching circuit configured to form a current path between the battery and a secondary side winding of the transformer during a second delivery period, and the first switching circuit has a dead time period in which the current path between the power source unit and the primary side winding is not formed, and the converter is operated to form a length of a portion where the dead time period and the second delivery period overlap each other when the battery is discharged to be shorter than the length of the portion when the battery is charged.

14 Claims, 6 Drawing Sheets

(30) Foreign Application Priority Data

Aug. 12, 2021 (KR) .......................... 10-2021-0106588
Aug. 18, 2021 (KR) .......................... 10-2021-0108833

(58) Field of Classification Search
USPC ......................................................... 320/109
See application file for complete search history.

(56) References Cited

U.S. PATENT DOCUMENTS

2016/0344297 A1* 11/2016 Lee .................... H02M 3/33592
2019/0214922 A1*  7/2019 Notsch ................. H02M 3/285

OTHER PUBLICATIONS

Dead-time effect analysis of a three-phase dual-active bridge DC/DC converter (Year: 2018).*
Mishima, T., et al., "A Dual Voltage Power System by Battery/ Supercapacitors Hybrid Configuration," IEEE 36th Power Electronics Specialists Conference, 2005, pp. 1845-1850 (Jan. 1, 2005).
Extended European Search Report dated Jan. 3, 2023 as received in Application No. 22181874.3.

* cited by examiner

CONTROLLER FOR CONTROLLING CONVERTER CHARGING AND DISCHARGING BATTERY AND CHARGER AND DISCHARGER

TECHNICAL FIELD

The present disclosure relates to a controller for controlling a converter charging and discharging a battery and a charger and discharger.

BACKGROUND ART

A secondary battery is a battery that may be repeatedly discharged and charged and used repeatedly, and is used in various electronic products. In particular, in recent years, the secondary battery is widely used in portable electronic devices such as mobile devices and smart watches, and the amount of usage is gradually increasing with the increase in the spread of electric vehicles.

The secondary battery may be manufactured in the form of a package including a plurality of battery cells, and the secondary battery manufactured in a factory or the like may not be directly shipped, but may be shipped through an activation process. The activation process is a process for activating the secondary battery to be used normally.

There is a formation process in which the charging and discharging of the secondary battery is repeated in the activation process, and in the formation process, the battery is continuously charged and discharged using a converter. At this time, the better the efficiency of the battery upon charging and discharging the battery, the better the energy efficiency in the entire formation process.

SUMMARY OF INVENTION

Technical Problem

An object of the present disclosure is to provide a controller and a charger and discharger for improving a difference between efficiency upon battery charging of a converter included in the charger and discharger and efficiency upon battery discharging thereof.

Another object of the present disclosure is to provide a controller and a charger and discharger capable of improving a reduction in efficiency upon discharging a battery of a converter by adjusting positions of a dead time period of switches of a primary switching circuit of the converter of the charger and discharger.

Solution to Problem

A charger and discharger according to embodiments of the present disclosure is connected between a power source unit and a battery to charge and discharge the battery, and includes a converter, in which the converter includes a transformer configured to deliver power between a power source unit and the battery, a first switching circuit configured to form a current path between the power source unit and a primary side winding of the transformer during a first delivery period according to a switching operation, and a second switching circuit configured to form a current path between the battery and a secondary side winding of the transformer during a second delivery period according to a switching operation, and the first switching circuit has a dead time period in which the current path between the power source unit and the primary side winding of the transformer is not formed, and the converter is operated to form a length of a portion where the dead time period and the second delivery period overlap each other when the battery is discharged to be shorter than the length of the portion when the battery is charged.

Advantageous Effects of Invention

The controller and charger and discharger according to the embodiments of the present disclosure can improve the difference between efficiency upon charging and the efficiency upon discharging the battery of the converter included in the charger and discharger.

The controller and charger and discharger according to the embodiments of the present disclosure can improve the reduction in efficiency upon discharging the battery of the converter by adjusting the positions of the dead time period of the switches of the primary switching circuit of the converter of the charger and discharger.

DESCRIPTION OF EMBODIMENTS

In order to clearly describe the present disclosure, parts irrelevant to the description are omitted, and the same or similar components are denoted by the same reference numerals throughout the specification.

Although not defined otherwise, all terms including technical terms and scientific terms used herein have the same meaning as those commonly understood by those skilled in the art to which the present disclosure pertains. Commonly used terms defined in the dictionary are additionally interpreted as having a meaning consistent with the related technical literature and the presently disclosed content, and are not interpreted as having an ideal or very formal meaning unless defined.

Hereinafter, embodiments of the present disclosure will be described in detail with reference to the accompanying drawings so that those skilled in the art may easily carry out them. However, the present disclosure may be implemented in several different forms and is not limited to the embodiments described herein.

Figure 1:
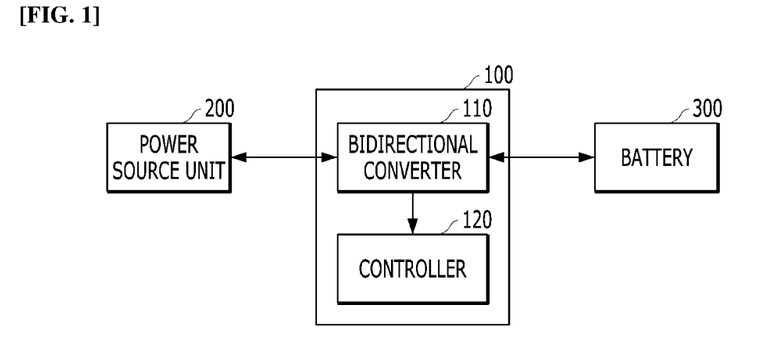
FIG. 1 shows a battery charging-discharging system according to embodiments of the present disclosure.

FIG. 1 shows a battery charging-discharging system according to embodiments of the present disclosure. Referring to FIG. 1, a battery charging-discharging system 10 may include a charger and discharger 100, a power source unit 200, and a battery 300.

The charger and discharger 100 may be connected to the power source unit 200 and the battery 300 to charge and discharge the battery 300.

The charger and discharger 100 may include a converter (hereinafter referred to as a converter 110) and a controller 120.

The converter 110 may charge the battery 300 using the power (or voltage/current) transmitted from the power source unit 200 or discharge the battery 300 by transmitting the power (or voltage/current) transmitted from the battery 300 to the power source unit 200. Meanwhile, when the battery 300 is discharged, the power transmitted from the battery 300 may be transmitted to a ground connected to the power source unit 200. In the embodiments, the converter 110 may convert the power transmitted from the power source unit 200 to transmit the converted power to the battery 300, and may also convert the power transmitted from the battery 300 to transmit the converted power to the power source unit 200.

The converter 110 may include a plurality of switches and transformers, and deliver power from the power source unit 200 to the battery 300 or from the battery 300 to the power source unit 200 according to the switching operation of the switches. For example, the converter 110 may be a phase-shift full bridge converter, but is not limited thereto.

The controller 120 may control the converter 110. In the embodiments, the controller 120 may generate a switching signal for controlling the switching of switches included in the converter 110. At this time, there may be a plurality of switching signals. For example, the controller 120 may determine whether to charge or discharge the battery 300 based on stored information, and output the switching signal for controlling the converter 110 depending on the determined charging-discharging of the battery 300. In other words, the controller 120 may output a switching signal for causing the converter 110 to charge the battery 300 when the battery 300 is charged and output a switching signal for causing the converter 110 to discharge the battery 300 when the battery 300 is discharged.

The power source unit 200 may transmit input power to the charger and discharger 100. In the embodiments, the power source unit 200 may transmit DC power to the charger and discharger 100, but the embodiments of the present disclosure are not limited thereto. In addition, the power source unit 200 may receive discharge power of the battery 300 transmitted from the charger and discharger 100. For example, the power source unit 200 may output the discharge power of the battery 300 through a ground terminal.

The battery 300 may be a device capable of storing or supplying electrical energy. In the embodiments, the battery 300 may be a secondary battery that may be repeatedly charged and discharged. For example, the battery 300 may be a lead-acid battery, a Ni—Cd battery, a Ni-MH battery, a Li-ion battery, and a solid-state battery, but the embodiments of the present disclosure are not limited thereto.

The battery 300 may be collectively referred to as a battery cell including a cathode, an anode, an electrolyte, and a separator, a battery module including a plurality of battery cells, or a battery pack including a plurality of battery modules.

Figure 2:
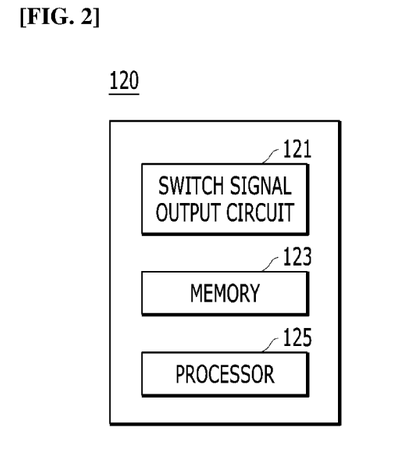
FIG. 2 shows a controller according to embodiments of the present disclosure.

FIG. 2 shows a controller according to embodiments of the present disclosure. Referring to FIG. 2, the controller 120 may include a switching signal output circuit 121, a memory 123, and a processor 125.

The switching signal output circuit 121 may output a switching signal for controlling the converter 110. In the embodiments, the switching signal output circuit 121 may generate switching signals for controlling the switches included in the converter 110 and output the generated switching signals to the converter 110. For example, the switching signal output circuit 121 may output a charge switching signal for charging the battery 300 and a discharge switching signal for discharging the battery 300. In other words, in the following specification, the charge switching signal and the discharge switching signal are collectively referred to as a switching signal.

In the embodiments, the switching signal output circuit 121 may generate the switching signal using offset information stored in a memory 123 and a reference clock signal. For example, the switching signal output circuit 121 may generate the charge switching signals based on first offset information stored in a first space of the memory 123 and generate the discharge switching signals based on second offset information stored in a second space of the memory 123.

In the embodiments, the switching signal output circuit 121 may generate a switching signal for controlling a pulse width modulation (PWM) of the converter 110. In other words, the switching signal output circuit 121 may control the output power of the converter 110 by adjusting a duty cycle of the switching signal output to the converter 110.

The memory 123 may store data necessary for operating the controller 120. In the embodiments, the memory 123 may store data used to generate a control signal for controlling the converter 110. In addition, the memory 123 may store information related to a charge-discharge schedule for the battery 300 of the charger and discharger 100. In addition, the memory 123 may store information on a state (voltage, current, temperature, and the like) of the battery 300.

At this time, the controller 120 may determine whether to charge or discharge the battery 300 based on the information related to the charge and discharge schedule for the battery 300 stored in the memory 123.

The processor 125 may control the overall operation of the controller 120. In the embodiments, the processor 125 may control the operation of the controller 120 by controlling the switching signal output circuit 121 and the memory 123.

For example, the processor 125 is an integrated circuit having an arithmetic processing function, and may be a central processing unit (CPU), a micro controller unit (MCU), a graphic processing unit (GPU), an application specific integrated circuit (ASIC), a field programmable gate array (FPGA), or an application processor (AP), but the embodiments of the present disclosure are not limited thereto.

The processor 125 may generate a control command for causing the switching signal output circuit 121 to output the switching signal. The switching signal output circuit 121 may generate the switching signal by reading offset information from the memory 123 in response to the control command.

The processor 125 may control the switching signal output circuit 121 so that the switching signal output circuit 121 outputs different switching signals according to the charging-discharging state of the battery 300.

For example, when the battery 300 is being charged, the processor 125 may output a first control command to the switching signal output circuit 121, and the switching signal output circuit 121 may output the charge switching signals to the converter 110 in response to the first control command. At this time, the switching signal output circuit 121 may generate the charging switching signals in response to the first control command.

For example, when the battery 300 is being discharged, the processor 125 may output a second control command to the switching signal output circuit 121, and the switching signal output circuit 121 may output the discharge switching signals to the converter 110 in response to the second control command. At this time, the switching signal output circuit 121 may generate the discharge switching signals in response to the second control command.

In the embodiments, the processor 125 may determine whether the battery 300 is being charged or discharged based on the information related to the charge-discharge schedule for the battery 300 stored in the memory 123.

The switching signal output circuit 121 according to the embodiments of the present disclosure may output switching signals having different characteristics to the converter 110 according to the charging and discharging states of the battery 300. In particular, even when the power between the converter 110 and the battery 300 is the same, the characteristics of the charging switching signal output upon charging and the discharging switching signal output upon discharging may be different from each other. Accordingly, it is possible to improve the charging and discharging efficiency of the converter 110.

Figure 3:
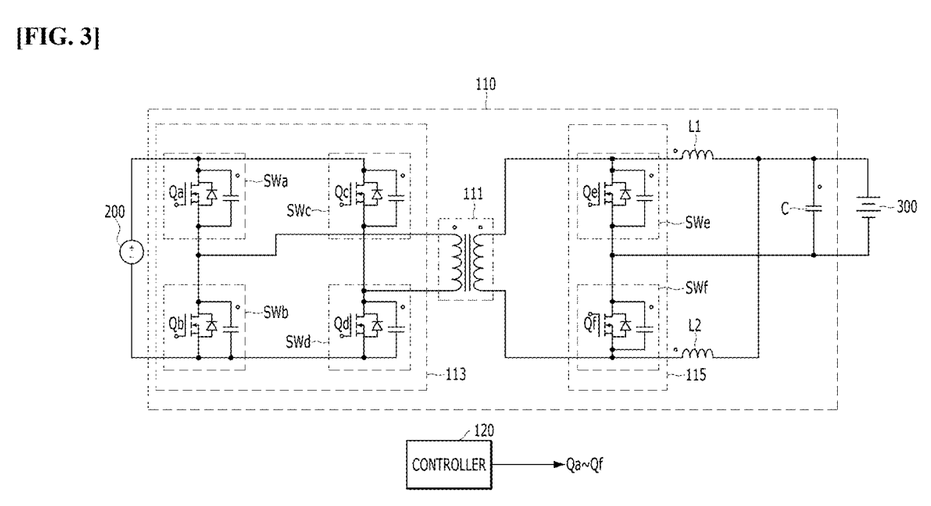
FIG. 3 shows a converter according to embodiments of the present disclosure.

FIG. 3 shows a converter according to embodiments of the present disclosure. Referring to FIG. 3, the converter 110 may include a transformer 111, a first switching circuit 113, a second switching circuit 115, and a current sensor 117. The converter 110 may be connected between the power source unit 200 and the battery 300.

Meanwhile, additionally, the converter 110 may further include elements (inductor L1 and L2 and capacitor C) disposed between the power source unit 200 and the transformer 111 and between the transformer 111 and the battery 300, but this is not required.

The transformer 111 may be configured to deliver power between the power source unit 200 and the battery 300. In the embodiments, the transformer 111 may convert the power of the primary side circuit (e.g., a circuit of the power source unit 200) into power of a certain multiple to transmit the power to the secondary side circuit (e.g., a circuit of the battery 300) or convert the power of the secondary side circuit into power of a reciprocal of the certain multiple to transmit the power to the primary side circuit. For example, the transformer 111 may include a primary side winding corresponding to the primary side circuit and a secondary side winding corresponding to the secondary side circuit.

The first switching circuit 113 may be connected between the power source unit 200 and the transformer 111. In the embodiments, the first switching circuit 113 may be connected between the power source unit 200 and the primary side winding of the transformer 111 to form a current path according to a switching operation. For example, a current may flow between the power source unit 200 and the primary side winding of the transformer 111 according to the switching operation of the first switching circuit 113.

The second switching circuit 115 may be connected between the battery 300 and the transformer 111. In the embodiments, the second switching circuit 115 may be connected between the battery 300 and the secondary side winding of the transformer 111 to form a current path according to a switching operation. In other words, a current may flow between the battery 300 and the secondary side winding of the transformer 111 according to the switching operation of the second switching circuit 115.

In other words, the converter 110 according to the embodiments of the present disclosure may convert the power of the power source unit 200 to transmit the converted power to the battery 300 and also convert the power of the battery 300 to transmit the converted power to the power source unit (power source unit 200 according to the operations of the first switching circuit 113 and the second switching circuit 115.

The first switching circuit 113 may include a plurality of switches SWa, SWb, SWc, and SWd. Each of the plurality of switches SWa, SWb, SWc, and SWd may include a switching element (e.g., a transistor or a diode). Additionally, each of the plurality of switches SWa, SWb, SWc, and SWd may further include an energy storage element such as a capacitor.

The plurality of switches SWa, SWb, SWc and SWd may be turned on and turned off in response to input switching signals Qa, Qb, Qc, and Qd, respectively, and a current path between the power source unit 200 and the primary side winding of the transformer 111 may be formed according to the turn-on and turn-off of the plurality of switches SWa, SWb, SWc and SWd.

A first switch SWa may be connected to one end of the power source unit 200 and one end of the primary side winding of the transformer 111 to be operated in response to a first switching signal Qa. A second switch SWb may be connected to the other end of the power source unit 200 and one end of the primary side winding of the transformer 111 to be operated in response to a second switching signal Qb.

In order to prevent a short circuit in the circuit, the first switch SWa and the second switch SWb may be operated complementarily to each other. In other words, a turn-on time (or turn-off time) of the first switch SWa and a turn-on time (or turn-off time) of the second switch SWb may not overlap each other. The first switch SWa and the second switch SWb may be referred to as a front-end switch.

A third switch SWc may be connected to one end of the power source unit 200 and the other end of the primary side winding of the transformer 111 to be operated in response to a third switching signal Qc. A fourth switch SWd may be connected to the other end of the power source unit 200 and the other end of the primary side winding of the transformer 111 to be operated in response to a fourth switching signal Qd.

In order to prevent a short circuit in the circuit, the third switch SWc and the fourth switch SWd may be operated complementarily to each other. In other words, a turn-on time (or turn-off time) of the third switch SWc and a turn-on time (or turn-off time) of the fourth switch SWd may not overlap each other. The third switch SWc and the fourth switch SWd may be referred to as a rear-end switch.

The first switching circuit 113 may form a current path between the power source unit 200 and the primary side winding of the transformer 111 during a first delivery period. For example, the first delivery period may include a period in which the first switch SWa and the fourth switch SWd are turned on, and a period in which the second switch SWb and the third switch SWc are turned on.

The second switching circuit 115 may include a plurality of switches SWe and Swf. Each of the plurality of switches SWe and Swf may include a switching element (e.g., a transistor or a diode). Additionally, each of the plurality of switches SWe and Swf may further include an energy storage element such as a capacitor.

The plurality of switches SWe and Swf may be turned on and turned off in response to each of input switching signals Qe and Qf, and a current path between the battery 300 and the secondary side winding of the transformer 111 may be formed according to the turn-on and turn-off of the plurality of switches SWe and Swf.

A fifth switch SWe may be connected to one end of the battery and one end of the secondary side winding of the transformer 111 to be operated in response to a fifth switching signal Qe. In the embodiments, one end of the fifth switch SWe may be connected to one end of the secondary side winding of the transformer 111 and the other end of the first inductor L1 having one end connected to the other end of the battery 300 together.

A sixth switch SWf may be connected to one end of the battery and the other end of the secondary side winding of the transformer 111 to be operated in response to a sixth switching signal Qf. In the embodiments, one end of the sixth switch SWf may be connected to the other end of the secondary side winding of the transformer 111 and the other end of the second inductor L2 having one end connected to the other end of the battery 300 together.

The second switching circuit 115 may form a current path between the power source unit 200 and the secondary side winding of the transformer 111 during a second delivery period. For example, the second delivery period may include a period in which at least one of the fifth switch SWe and the sixth switch SWf is turned off.

The current sensor 117 may measure a current flowing between the battery 300 and the converter 110. In the embodiments, the current sensor 117 may be connected between the second switching circuit 115 and the battery 300 to measure the intensity and direction of the current flowing between the second switching circuit 115 and the battery 300 and generate the measurement result.

In the embodiments, the measurement result by the current sensor 117 may be transmitted to the controller 120.

Figure 4:
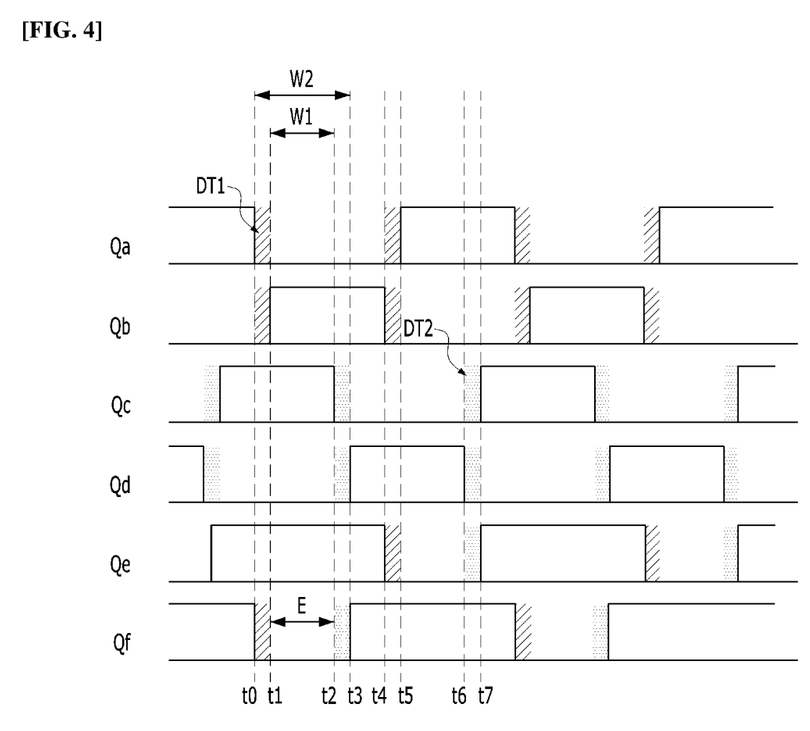
FIGS. 4 to 6 are views for describing an operation of the converter according to embodiments of the present disclosure.
Figure 5:
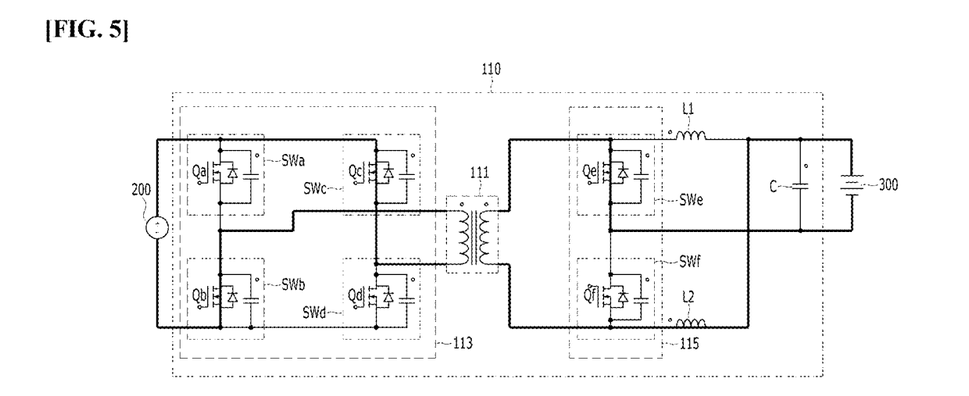
Figure 6:
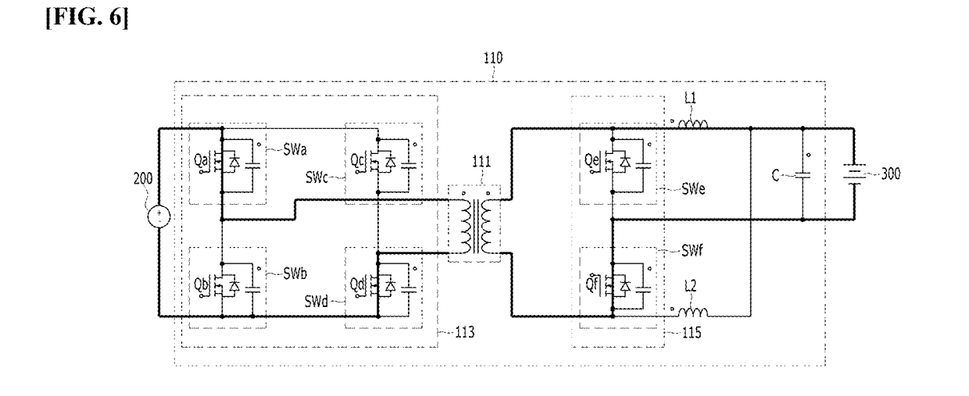

FIGS. 4 to 6 are views for describing an operation of the converter according to embodiments of the present disclosure.

Referring to FIGS. 4 to 6, as the switches SWa to SWf of the converter 110 are turned on and off, the current path between the power source unit 200 and the battery 300 is formed to enable the electric energy movement between the power source unit 200 and the battery 300. At this time, the charging and discharging of the battery 300 may be determined according to the magnitude of a current voltage of the battery 300 and an output voltage of the converter 110.

Referring to FIG. 4, the controller 120 may output the switching signals Qa to Qf for controlling the converter 110. In the embodiments, the controller 120 may output the switching signal for controlling the converter 110 based on the stored charge-discharge schedule information for the battery 300 and the current state (e.g., a voltage, a state of health (SOH), or a state of charge (SOC)) of the battery 300. For example, the switching signals Qa to Qf shown in FIG. 4 may be charging switching signals.

In the embodiments, the switching signals Qa to Qf may be a PWM signal in the form of pulse having a constant period. Each of the switches SWa to SWf may be turned on in response to each of the switching signals Qa to Qf of a high level and turned off in response to each of the switching signals Qa to Qf of a low level, but the present disclosure is not limited thereto.

In the embodiments, duty ratios of the switching signals Qa, Qb, Qc, and Qd may be 50%. Meanwhile, the magnitude of the output voltage (voltage across the primary side winding/secondary side winding) of the converter 110 may be based on an overlapping width between a high level period of the first switching signal Qa and a high level period of the fourth switching signal Qd.

For the complementary operation of the front-end switches SWa and SWb, the high level period of the first switching signal Qa and the high level period of the second switching signal Qb may not overlap each other. For the stable and complementary operation of the front-end switches SWa and SWb, a first dead time period DT1 may exist between the high level period of the first switching signal Qa and the high level period of the second switching signal Qb. In other words, the controller 120 may output a rising edge of the second switching signal Qb after the first dead time from a time point at which a falling edge of the first switching signal Qa is output.

Likewise, for the complementary operation of the rear-end switches SWc and SWd, a high level period of the third switching signal Qc and a high level period of the fourth switching signal Qd may not overlap each other. A second dead time period DT2 may exist between the high level period of the third switching signal Qc and the high level period of the fourth switching signal Qd. In other words, the controller 120 may output a rising edge of the fourth switching signal Qd after the second dead time from a time point at which a falling edge of the third switching signal Qc is output.

Meanwhile, during the dead time periods DT1 and DT2 of the first switching circuit 113, since a pair of complementarily operated switches SWa and SWb are all turned off, and only any one of the other pair of complementarily operated switches SWc and Swd is turned on, the current path of the first switching circuit 113 is not formed.

FIG. 5 shows the operation of the converter in a period [t0, t3] in FIG. 4.

In the period [t0, t1], the switches SWa and SWb are all turned off. In other words, the period [t0, t1] is the first dead time period DT1. In the period [t0, t1], no energy is transmitted by the transformer 111.

In a period [t1, t2], the second switch SWb and the third switch SWc are turned on in response to the switching signals. According to the complementary operation, the first switch SWa and the fourth switch SWd are turned off. In addition, the sixth switch SWf is turned off, and according to the complementary operation, the fifth switch SWf is turned on. In the period [t1, t2], the power of the power source unit 200 is applied to the primary side winding of the transformer 111. The transformer 111 converts the power applied to the primary side winding to transmit the converted power to the secondary side winding. The converted power transmitted to the secondary side winding of the transformer 111 is transmitted to the battery 300 through the second inductor L2. In other words, in the period [t1, t2], energy is transmitted by the transformer 111, and the battery 300 is charged (or discharged).

In a period [t2, t3], the switches SWc and SWd are all turned off. In other words, the period [t2, t3] is the second dead time period DT2, and no energy is transmitted by the transformer 111.

FIG. 6 shows the operation of the converter in a period [t4, t7] in FIG. 4.

In a period [t4, t5], the switches SWa and SWb are all turned off. In other words, the period [t4, t5] is the first dead time period DT1. In the period [t4, t5], no energy is transmitted by the transformer 111.

In a period [t5, t6], the first switch SWa and the fourth switch SWd are turned on in response to the switching signals. According to the complementary operation, the second switch SWb and the third switch SWc are turned off.

In addition, the fifth switch SWe is turned off, and according to the complementary operation, the sixth switch SWf is turned on. In the period [t5, t6], the power of the power source unit 200 is applied to the primary side winding of the transformer 111. The transformer 111 converts the power applied to the primary side winding to transmit the converted power to the secondary side winding. The converted power transmitted to the secondary side winding of the transformer 111 is transmitted to the battery 300 through the second inductor L2. In other words, in the period [t5, t6], energy is transmitted by the transformer 111, and the battery 300 is charged (or discharged).

In a period [t6, t7], the switches SWc and SWd are all turned off. In other words, the period [t6, t7] is the second dead time period DT2, and no energy is transmitted by the transformer 111.

As described above, in a period E in which a first delivery period W1 of the first switching circuit 113 and a second delivery period W2 of the second switching circuit 115 overlap, energy may be transmitted (charged) between the power source unit 200 and the battery 300, and in this period, the battery 300 may be charged or discharged.

Meanwhile, referring back to FIG. 4, the dead time period DT1 or DT2 of the first switching circuit 113 and the second delivery period W2 of the second switching circuit 115 may at least partially overlap. In this case, due to the asymmetry of the first switching circuit 113 and the second switching circuit 115, a phenomenon in which discharging efficiency is lower than charging efficiency of the battery 300 may occur.

Accordingly, the charger and discharger 100 according to the embodiments of the present disclosure may relatively increase efficiency upon discharging the battery 300 by forming a length of a portion where the dead time period DT1 or DT2 of the switches of the first switching circuit 113 and the second delivery period of the second switching circuit 115 overlap each other when the battery is discharged to be relatively shorter than a length when the battery is charged.

At this time, the formation of the portion where the dead time period DT1 or DT2 of the switches of the first switching circuit 113 and the second delivery period of the second switching circuit 115 overlap each other when the battery is discharged to be shorter than the length when the battery is charged is called a 'dead time shifting.'

Figure 7:
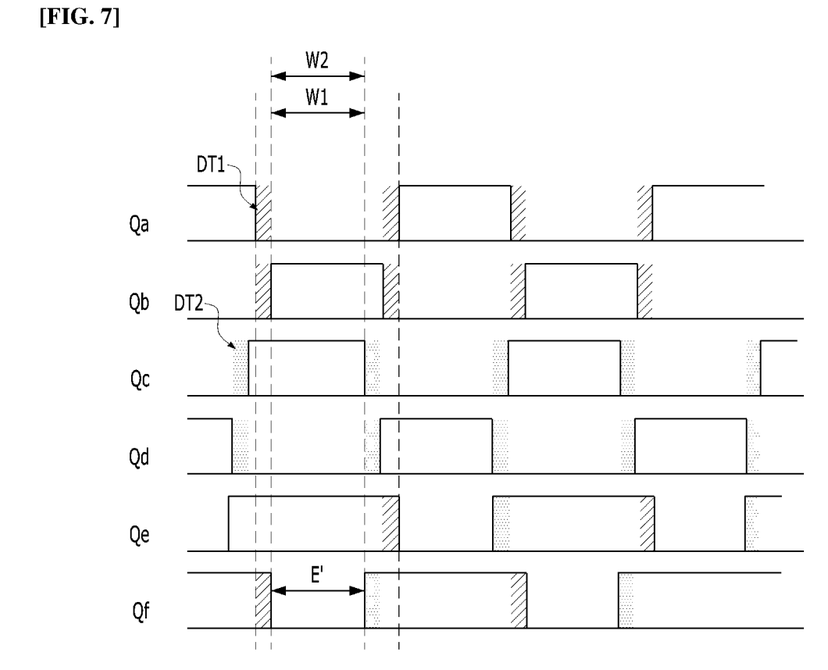
FIG. 7 shows switching signals output to the converter upon discharging according to embodiments of the present disclosure.

FIG. 7 shows switching signals output to the converter upon discharging according to embodiments of the present disclosure. The switching signals Qa to Qf shown in FIG. 7 may be signals output by the controller 120 when the battery 300 is discharged. Meanwhile, when the battery 300 is charged, the controller 120 may output the switching signals Qa to Qf shown in FIG. 4.

The controller 120 may determine whether the battery 300 is being charged or discharged (i.e., whether the converter 110 performs a charging or discharging operation) and output the switching signals Qa to Qf corresponding to each charging or discharging according to the determination result.

In the embodiments, the controller 120 may determine whether the battery 300 is being charged or discharged by using the measurement result generated by the current sensor 117. In the embodiments, the current sensor 117 may measure the intensity and direction of the current between the converter 110 and the battery 300 to transmit the measurement result to the controller 120 and the controller 120 may determine whether the battery 300 is being charged or discharged through the measurement result. For example, when the measurement result indicates that the current flows from the converter 110 to the battery 300, the controller 120 may determine that the battery 300 is being charged.

Alternatively, in the embodiments, the controller 120 may determine whether the battery 300 is currently being charged or discharged by using the information related to the charging-discharging schedule for the battery 300 stored in the memory 123. In this case, it should be understood that the current sensor 117 shown in FIG. 3 may be omitted.

Compared with FIG. 4, the controller 120 may output the switching signals Qa to Qf so that the length of the portion where the dead time period DT1 or DT2 of the first switching circuit 113 and the second delivery period of the second switching circuit 115 overlap each other when the battery is discharged is formed to be shorter than the length when the battery is charged. For example, the controller 120 may output different switching signals Qa to Qd to the first switching circuit 113 upon charging and discharging.

The controller 120 may perform the dead time shifting while maintaining the charge-discharge voltage of the battery 300 (or the output voltage of the charger and discharger 100). In other words, in the embodiments of the present disclosure, even when the current voltage of the battery 300 is the same, the switching signals Qa to Qf for controlling the converter 110 may be output so that the portions where the dead time period DT1 or DT2 of the switches and the second delivery period of the second switching circuit 115 overlap each other are different from each other depending whether the battery 300 is charged or discharged.

In the embodiments, the controller 120 may perform the dead time shifting by setting the duty lengths and duty ratios of the switching signals Qa to Qd to be the same when the battery 300 is charged and discharged, and adjusting only the position of the dead time period DT1 or DT2 of the switching signals Qa to Qd. For example, even when the dead time shifting is performed, the length of the dead time period DT1 or DT2 itself may not be changed.

In the embodiments, the controller 120 may perform the dead time shifting by adjusting the relative positions of the switching signals Qa to Qd of the first switching circuit 113 with respect to the switching signals Qe or Qf of the second switching circuit 115.

In the embodiments, the controller 120 may perform the dead time shifting by applying different offsets to the reference clock signal when the battery 300 is charged and discharged.

According to the dead time shifting, it is possible to improve the efficiency upon discharging the battery 300 of the charger and discharger 100.

For example, in FIG. 4, in the portion where the dead time period DT1 or DT2 of the switches and the second delivery period of the second switching circuit 115 overlap each other, the battery 300 forms the current path with the secondary side winding of the transformer 111, but the primary side winding of the transformer 111 does not form the current path with the power source unit 200, so that the discharge efficiency of the battery 300 is reduced. For example, the energy delivery period E is shorter than the second delivery period W2 of the second switching circuit 115 due to the first dead time period DT1.

On the other hand, in FIG. 7, since there is no overlapping portion between the dead time period DT1 or DT2 of the switches and the second delivery period of the second switching circuit 115, the current path between the battery 300 and the secondary side winding of the transformer 111 is formed and the current path between the power source unit 200 and the primary side winding of the transformer 111 is formed, so that the discharge efficiency of the battery 300 is not reduced. For example, since the first dead time period DT1 is positioned outside the second delivery period W2, an energy delivery period E matches with the second delivery period W2.

Figure 8:
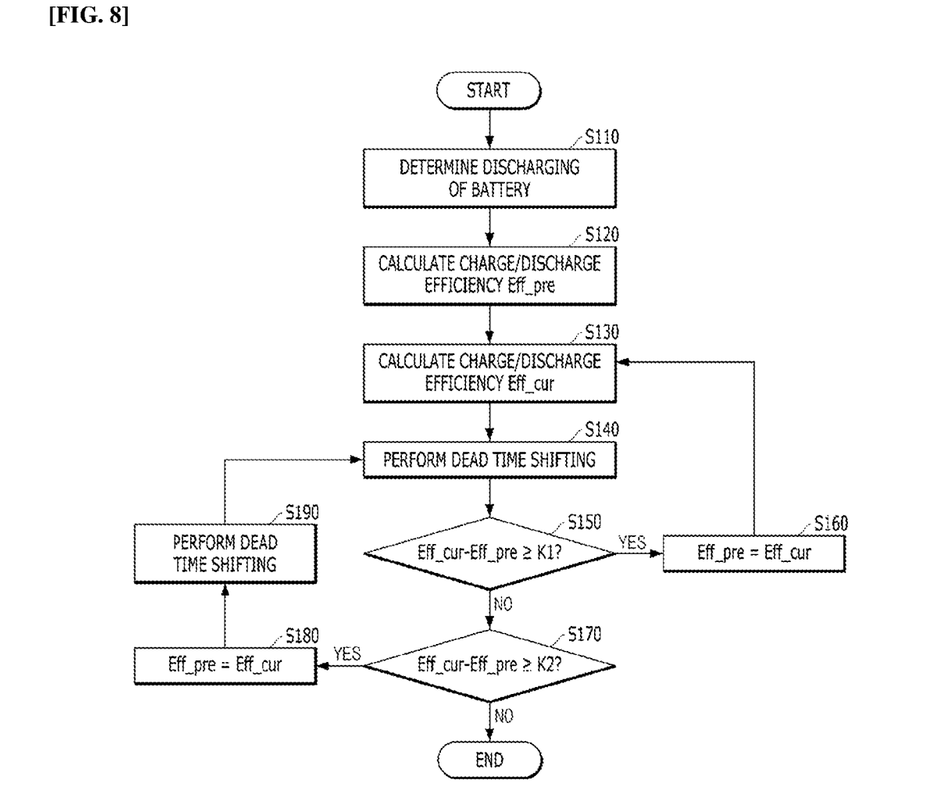
FIG. 8 is a flowchart for describing a dead time shifting according to embodiments of the present disclosure.

FIG. 8 is a flowchart for describing a dead time shifting according to embodiments of the present disclosure. A method described with reference to FIG. 8 may be performed by the controller 120.

Referring to FIG. 8, the controller 120 may calculate the charge-discharge efficiency of the battery 300 of the converter 110 before and after the dead time shifting, compare the charge-discharge efficiency with reference values, and adjust whether to additionally perform the dead time shifting and the degree of the dead time shifting according to the comparison results.

Referring to FIG. 8, the controller 120 may determine that the battery 300 is being discharged (S110). In the embodiments, the processor 125 may determine that the battery 300 is being discharged by using information related to the battery 300. For example, the processor 125 may determine that the battery 300 is being discharged based on the charge-discharge schedule of the charger and discharger 100 for the battery 300, the direction of current introduced into the battery 300, and the voltage of the battery 300.

The controller 120 may calculate the charge-discharge efficiency Eff_pre before the dead time shifting (S120). In the embodiments, the processor 125 may calculate the charge-discharge efficiency Eff_pre based on the ratio of the input power to the output power of the converter 110.

In the embodiments, the charge-discharge efficiency Eff_pre may be calculated according to Equation 1 below.

$$\text{Eff}_{pre} = f((V_{out} \times I_{out}), (V_{in} \times I_{in}))\quad\text{Equation 1}$$

Here, f refers to an arbitrary function, $V_{out}$ refers to an output voltage of the converter 110, $I_{out}$ refers to an output current of the converter 110, $V_{in}$ refers to an input voltage of the converter 110, and $I_{in}$ refers to an input current of the converter 110.

The processor 125 may store the calculated charge-discharge efficiency Eff_pre before the dead time shifting in the memory 123.

The controller 120 may perform the dead time shifting (S130). In the embodiments, the processor 125 may control the switching signal output circuit 121 to output the switching signal that causes the portion where the dead time period DT1 or DT2 of the switches of the first switching circuit 113 and the second delivery period of the second switching circuit 115 to overlap each other when the battery is discharged to be shorter than a length when the battery is charged.

In the embodiments, the controller 120 may shift the dead time period DT1 or DT2 by a positive offset. Here, when the dead time period DT1 or DT2 is shifted by the positive offset, it means that the first dead time period DT1 is positioned earlier upon discharging than upon charging or the second dead time period DT2 is positioned later upon discharging than upon charging.

The controller 120 may calculate the charge-discharge efficiency Eff_cur after the dead time shifting (S140). In the embodiments, the processor 125 may calculate the charge-discharge efficiency Eff_cur based on a ratio of the input power to the output power of the converter 110. The processor 125 may store the calculated charge-discharge efficiency Eff_cur in the memory 123 after the dead time shifting.

The charge-discharge efficiency Eff_cur after the dead time shifting may be calculated according to the same method as that of the charge-discharge efficiency Eff_pre before the dead time shifting.

The controller 120 may determine whether the difference (Eff_cur−Eff_pre) between the charge-discharge efficiencies before and after the dead time shifting is greater than or equal to a first value K1 (S150). In the embodiments, the processor 125 may read the charge-discharge efficiencies Eff_pre and Eff_cur stored in the memory 123, and determine whether the difference (Eff_cur−Eff_pre) between the charge-discharge efficiencies is greater than or equal to the first value K1 by calculating the difference. At this time, the first value K1 may be a positive number.

When the difference (Eff_cur−Eff_pre) between the charge-discharge efficiencies is greater than or equal to the first value K1 (YES in S150), the controller 120 may store the charge-discharge efficiency Eff_cur after the dead time shifting as the charge-discharge efficiency Eff_pre before the dead time shifting (S160) and perform the dead time shifting again (S130).

In other words, when the difference (Eff_cur−Eff_pre) between the charging-discharging efficiencies is greater than or equal to the first value K1, it means that the charge-discharge efficiency has been improved according to the dead time shifting, so that the controller 120 may perform the dead time shifting again in order to additionally improve the charge-discharge efficiencies (S130).

When the difference (Eff_cur−Eff_pre) between the charge-discharge efficiencies is less than the first value K1 (NO in S150), the controller 120 may determine that the difference (Eff_cur−Eff_pre) between the charge-discharge efficiencies before and after the dead time shifting is greater than or equal to a second value K2 (S170). At this time, the second value K2 may be a negative number. For example, the second value K2 may be the inverse of the addition of the first value K1 (i.e., −K1).

When the difference (Eff_cur−Eff_pre) between the charging-discharging efficiencies is smaller than or equal to the second value K2 (YES in S170), the processor 125 may store the charge-discharge efficiency Eff_cur after the dead time shifting as the charge-discharge efficiency before the dead time shifting Eff_pre (S180) and perform the dead time shifting again (S190). At this time, the controller 120 may shift the dead time period DT1 or DT2 by a negative offset. Here, when the dead time period DT1 or DT2 is shifted by the negative offset, it means that the first dead time period DT1 is positioned later upon discharging than upon charging or the second dead time period DT2 is positioned earlier upon discharging than upon charging.

In other words, when the difference (Eff_cur−Eff_pre) between the charging-discharging efficiencies is smaller than or equal to the second value K2, it means that the charge-discharge efficiency deteriorates according to the dead time shifting, so that the controller 120 may perform the dead time shifting in a direction opposite to the dead time shifting previously performed, thereby restoring the charge-discharge efficiency deteriorating by the dead time shifting.

When the difference (Eff_cur−Eff_pre) between the charging-discharging efficiencies is greater than or equal to the second value K2 (NO in S170), the controller 120 may end the dead time shifting.

In the method described with reference to FIG. 8, the controller 120 may determine an optimal dead time shifting for improving the discharge efficiency of the converter 110.

Figure 9:
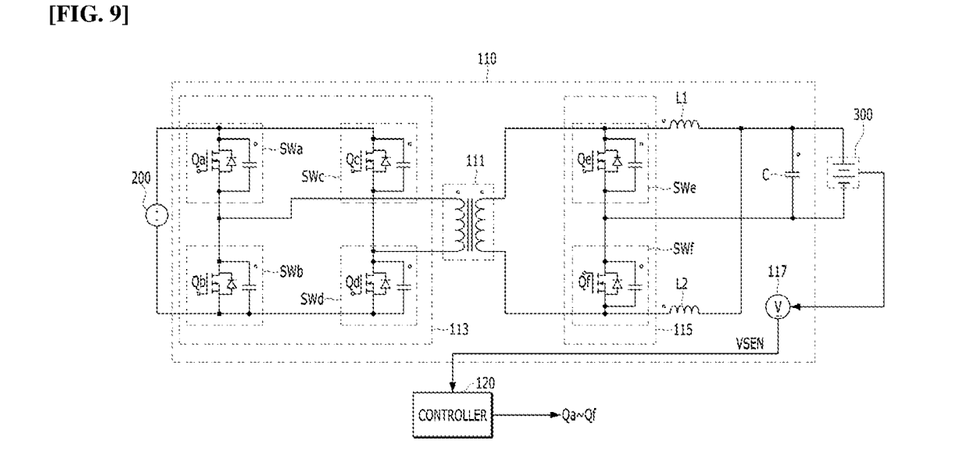
FIG. 9 shows the converter according to embodiments of the present disclosure.

FIG. 9 shows the converter according to embodiments of the present disclosure. Compared with FIG. 3, a converter 110A in FIG. 9 has a difference in that the current sensor 117 of the converter 110 in FIG. 3 is replaced with a voltage sensor 118, and there is a difference in that a controller 120A determines the charging or discharging of the battery 300 using measurement result VSEN output from the voltage sensor 118.

Referring to FIG. 9, the voltage sensor 118 may measure a current voltage of the battery 300 and generate the measurement result VSEN. The measurement result VSEN may be transmitted to the controller 120A.

The controller 120A may determine whether the battery 300 is being charged or discharged using the measurement result VSEN generated by the voltage sensor 118. In the embodiments, the controller 120A may periodically receive the measurement result VSEN from the voltage sensor 118, and determine whether the battery 300 is being charged or discharged by determining whether the voltage of the battery 300 increases or decreases based on the received measurement result VSEN.

The controller 120A may determine whether the battery 300 is charged and discharged depending on the measurement result of the voltage sensor 118 and output the switching signals Qa to Qf suitable for the situation of each battery 300 according to the determination result. The operation of the controller 120A for outputting the switching signals Qa to Qf depending on whether the battery 300 is charged or discharged is the same as the operation and principle of the controller 120 described with reference to FIGS. 1 to 8.

While the preferred embodiments of the present disclosure have been described above, the present disclosure may be modified in various forms, and those skilled in the art will understand that various modified examples and changed examples may be carried out without departing from the claims of the present disclosure.

The invention claimed is:

1. A charger and discharger charging and discharging a battery, the charger and discharger comprising: a converter, wherein the converter includes
 a transformer configured to deliver power between a power source unit and the battery;
 a first switching circuit configured to form a current path between the power source unit and a primary side winding of the transformer during a first delivery period according to a switching operation; and
 a second switching circuit configured to form a current path between the battery and a secondary side winding of the transformer during a second delivery period according to a switching operation, and
 wherein the first switching circuit operates within a dead time period in which the current path between a power source unit and the primary side winding of the transformer is not formed, and
 the converter is operated to form a length of a portion where the dead time period and the second delivery period overlap each other when the battery is discharged to be shorter than the length of the portion when the battery is charged.

2. The charger and discharger of claim 1, wherein a first switching circuit is a full bridge circuit.

3. The charger and discharger of claim 2, wherein the first switching circuit includes:
 a pair of first switches connected between the power source unit and the primary side winding of the transformer to be complementarily operated; and
 a pair of second switches connected between the power source unit and the primary side winding of the transformer to be complementarily operated.

4. The charger and discharger of claim 3, wherein the dead time period is a period in which any one pair of switches of the pair of first switches and the pair of second switches is all turned off.

5. The charger and discharger of claim 1, wherein the second switching circuit includes two switches having one end connected to a secondary side winding of the transformer and the other end connected to the battery.

6. The charger and discharger of claim 5, wherein the second delivery period is a period in which any one of the two switches is turned off.

7. The charger and discharger of claim 1, wherein the converter is operated so that the dead time period and the second delivery period do not overlap each other when the battery is discharged.

8. The charger and discharger of claim 1, further including:
 a controller configured to generate switching signals for controlling the switching operation of the first switching circuit and the second switching circuit.

9. The charger and discharger of claim 8, wherein the controller determines whether the battery is being charged or discharged and
 adjusts output timings of the switching signals depending on whether the battery is charged or discharged.

10. The charger and discharger of claim 9, wherein the controller outputs the switching signals for causing the output timings of the switching signals when the battery is charged and the output timings of the switching signals when the battery is discharged to be different from each other.

11. The charger and discharger of claim 9, wherein the controller outputs the switching signals for causing a length of a portion where the dead time period of the converter and the second delivery period overlap each other when the battery is discharged to be shorter than the length of the portion when the battery is charged.

12. The charger and discharger of claim 11, wherein the controller outputs the switching signals for causing the dead time period and the second delivery period to not overlap each other when the battery is discharged.

13. The charger and discharger of claim 9, wherein the controller outputs the switching signals for causing a position of the dead time period when the battery is discharged to be shifted with respect to a position of the dead time period when the battery is charged.

14. The charger and discharger of claim 13, wherein the controller calculates a difference between charge-discharge efficiencies of the battery, determines a degree of shift according to the charge-discharge efficiency, and outputs the switching signals for causing the dead time period to be shifted according to the determined degree of shift.

* * * * *